United States Patent [19]

Ito et al.

[11] Patent Number: 5,024,113
[45] Date of Patent: Jun. 18, 1991

[54] REVERSE DRIVE FOR VEHICLE

[75] Inventors: Toshifumi Ito; Atsuo Ohta; Shoji Yamashita, all of Saitama, Japan

[73] Assignee: Honda Giken Kogyo Kabushiki Kaisha, Tokyo, Japan

[21] Appl. No.: 542,649

[22] Filed: Jun. 26, 1990

Related U.S. Application Data

[63] Continuation of Ser. No. 244,332, Sep. 15, 1988, abandoned.

[30] Foreign Application Priority Data

Sep. 19, 1987 [JP] Japan .................................. 62-233748
Oct. 3, 1987 [JP] Japan .................................. 62-151780

[51] Int. Cl.$^5$ ............................................. F60K 23/00
[52] U.S. Cl. .......................................... 74/6; 74/661;
123/179 A; 180/65.2
[58] Field of Search ............................. 74/6, 7 E, 661;
123/179 A, 179 M; 180/65.2

[56] References Cited

U.S. PATENT DOCUMENTS

| 799,851 | 9/1905 | Hood | 74/6 |
|---|---|---|---|
| 1,822,673 | 9/1931 | Schwinke | 74/6 |
| 4,400,997 | 8/1983 | Figla | 74/661 |
| 4,405,029 | 9/1983 | Hunt | 74/661 |
| 4,410,071 | 10/1983 | Osterman | 74/6 |
| 4,763,538 | 8/1988 | Fujita et al. | 74/661 |

FOREIGN PATENT DOCUMENTS

| 1803829 | 2/1978 | Fed. Rep. of Germany | 74/661 |
|---|---|---|---|
| 60-124524 | 7/1985 | Japan | 74/661 |

Primary Examiner—Leslie A. Braun
Assistant Examiner—Scott Anchell
Attorney, Agent, or Firm—Lyon & Lyon

[57] ABSTRACT

Apparatus is described for use in a vehicle having a forward motion transmission operatively connected between an engine and the output shaft connecting the drive wheel and a reverse drive mechanism arranged to be operatively connected to the output shaft for driving the vehicle in reverse. A speed change shift device is arranged to operate the forward motion transmission and the reverse drive mechanism so as to prevent simultaneous operation of the two apparatus.

8 Claims, 9 Drawing Sheets

REVERSE DRIVE FOR VEHICLE

This application is a continuation of application Ser. No. 07/244,332 filed Sept. 15, 1988, now abandoned.

BACKGROUND OF THE INVENTION

The present invention relates to a reverse device for a vehicle, particularly a reverse device for a heavyweight motorcycle and employing an electric motor as its power source.

In large sized motorcycles, because of their heavyweight, it is necessary to expend much driver effort to effect reverse movement manually. When heavyweight motorcycles are power driven in the reverse direction, it is desirable that the system be such as will facilitate forward and reverse motions when the rider is not astride the motorcycle. As a prior art reverse device of this kind, there is known a device described in the specification of Japanese Patent Application Laid-Open No. 60-252079 (No. 252079/1985). The described device is provided with an auxiliary wheel which is connected to an electric motor mounted at a lower position on the motorcycle and which is so arranged as to be capable of taking a standing position and a withdrawn position, whereby the reverse movement is performed when the auxiliary wheel is in the standing condition. Such prior reverse device is characterized by the inconvenience that its utilization is difficult because the reverse motion can be performed only when the auxiliary wheel is physically moved into the standing condition.

It is accordingly an object of the present invention to provide a reverse device for a vehicle which incorporates, in the speed change shift device thereof, a reverse shift device whereby it is possible to perform forward and reverse shift operations by means of the same shift lever and making it possible to improve operability of the vehicle in moving from forward to reverse.

Further contemplated by the invention is a gear reduction system for such a motorcycle in which the rotational velocity of the power source can be significantly reduced, as for example, to a value of about one-hundredth of the original output value. Such gear reduction is desirable for the reverse drive of such motorcycles where a low reverse speed is preferable and where it is preferred that such low reverse speed be relatively constant, regardless of the load imposed on the vehicle.

SUMMARY OF THE INVENTION

In order to attain the aforesaid object, the present invention provides a reverse device for a vehicle which is adapted to use an electric motor as a power source and which has a reverse reduction gear that is provided to selectively engage with the output shaft that connects the rear wheel. The reverse device is inserted between the output shaft of the forward transmission system that uses the engine as its power source and the electric motor, whereby reverse motion is performed by reversely driving the output shaft by means of the electric motor. The invention utilizes a reverse shift device incorporated in the speed change shift device of the forward transmission system so as to be able to have only one speed change shift lever for common forward and reverse use and to engage intermittently and selectively the reverse reduction gear with said output shaft, whereby they are so operatively connected with each other that, when the speed change shift device is shifted into its forward drive position, the reverse reduction gear is disconnected from the output shaft and when the speed change shift device is shifted to its reverse drive position, the forward transmission is shifted into a neutral position.

In practice of the invention, the vehicle reverses when the speed change shift lever is switched from the forward position to the reverse position and the electric motor is driven. Accordingly, instantaneous shift from the forward to the reverse can be effected by a minimum operation without requiring complicated operations and the reverse motion can be performed with the rider astride the vehicle.

Also, interference between the respective power sources can be prevented by incorporating a reverse shift device in the speed change shift device according to the invention and so arranged as to be operatively connected with each other on reversing only when the power of the engine is interrupted.

The present invention further provides a reverse drive device in which motorcycle speed is maintained very low and relatively constant in the reverse direction. The reverse drive device is provided with gear reduction means that reduces the rotational velocity delivered by the power source to a value of about one-hundredth its original output value.

In motorcycles that permit the reverse motion to be performed by using an internal combustion engine as a power source, reverse speed can reach that less than about 2 km/h if the output rotational velocity of the internal combustion engine is reduced to a value less than about one hundredth the direct output velocity of the engine by means of reducing means that transmit the engine output to the wheel. Also, in motorcycles which permit reverse motion to be performed by using a motor, such as the starter motor, as a power source, if the output rotational velocity of the motor is set to an appropriate reduction ratio less than one hundredth thereof by the reducing means, it is possible to obtain a reverse speed of about 2 km/h, which speed is relatively constant regardless of changes in load.

For a better understanding of the invention, its operating advantages and the specific objectives obtained by its use, reference should be made to the accompanying drawings and description which relate to the preferred embodiments thereof.

DESCRIPTION OF THE PREFERRED EMBODIMENTS

Figure 1:
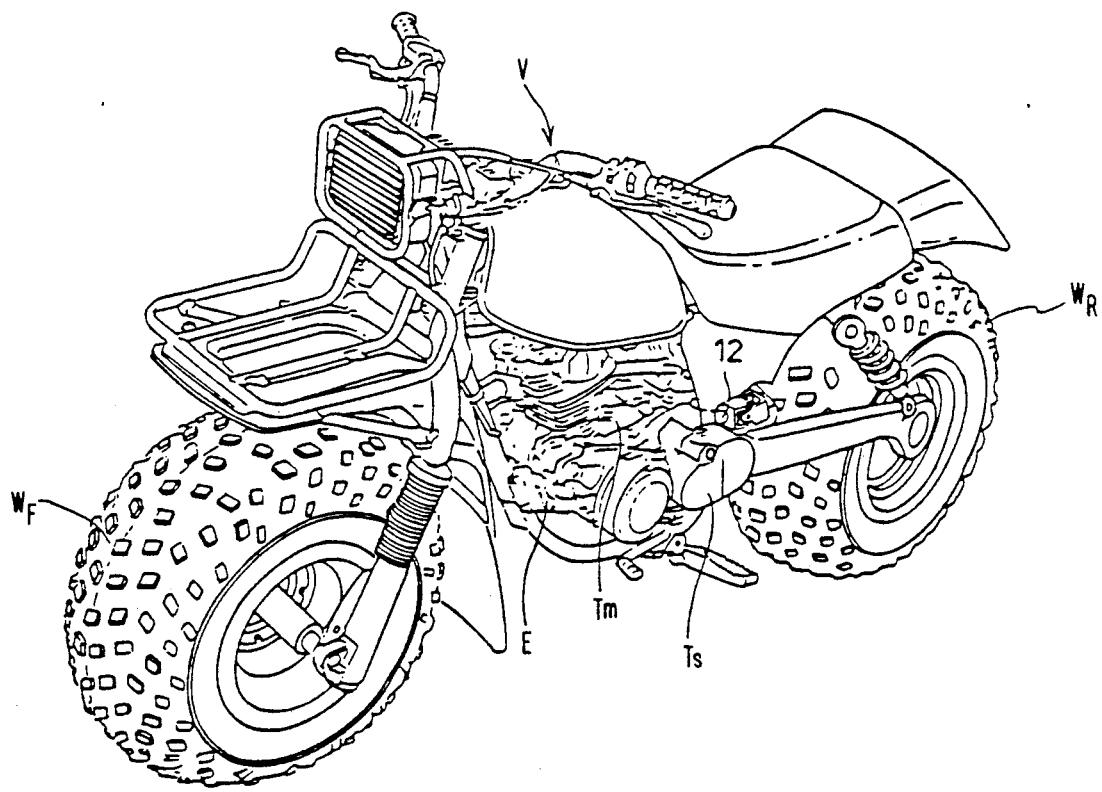
FIG. 1 is a perspective view illustrating a motorcycle of the type capable of utilizing the present invention.

In FIG. 1, reference V indicates a vehicle body provided with an engine E between a front wheel $W_F$ and a rear wheel $W_R$. A main transmission $T_M$ is located rearwardly of the engine E and a sub-transmission $T_S$ having a forward operating condition and a reverse operating condition is provided rearwardly of the main transmission $T_M$.

Figure 2:
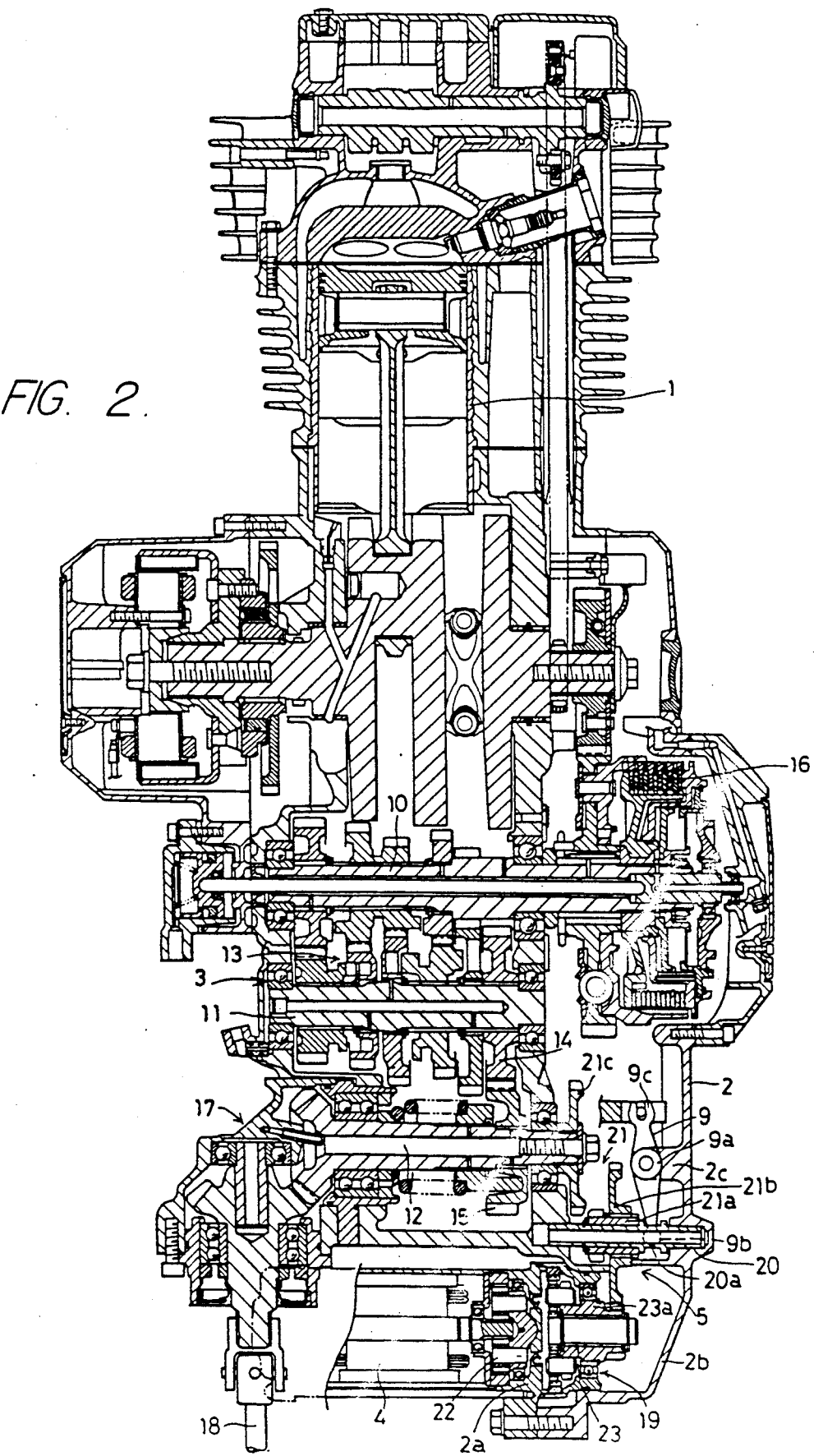
FIG. 2 is a sectional view showing a motorcycle power unit embodying the reversing electric motor of the present invention.

Referring to FIG. 2, reference numeral 2 indicates a housing of a power unit usable in the vehicle V. The power unit includes a forward transmission 3 accommodated in the housing, a dedicated electric motor 4 for reverse drive and a reverse reduction gear 5. When driving the vehicle forwardly, the rear wheel $W_R$ is driven by having the engine E as the power source through the intermediary of the forward transmission 3. When reversing, the rear wheel is reversely driven by having the electric motor 4 as a power source through the intermediary of the reverse reduction gear 5.

Figure 3:
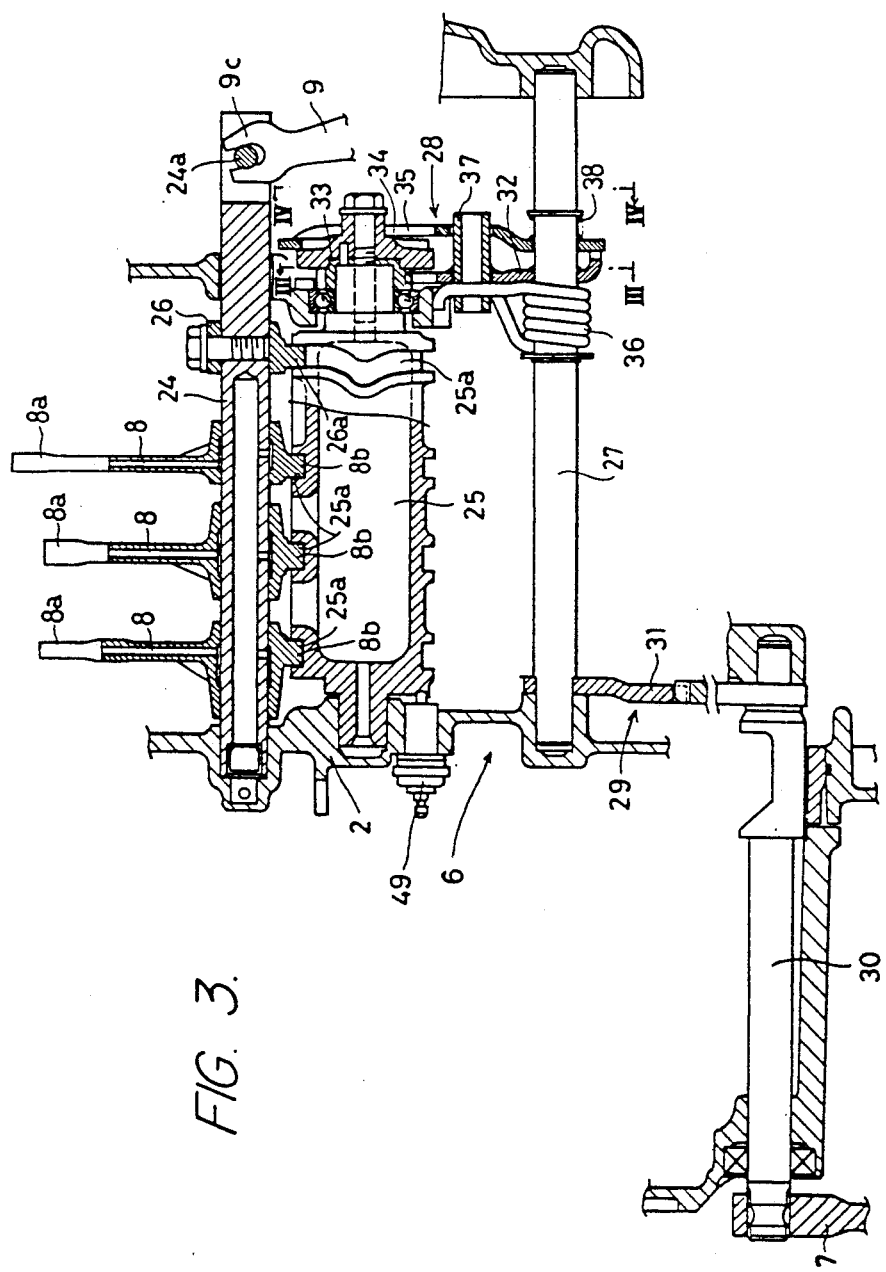
FIG. 3 is a plan view showing a shift system of the power unit.

Referring to FIG. 3, reference numeral 6 shows a speed change shift device. Reference numeral 7, indicated at the left end of FIG. 3, shows a shift pedal which is a speed change shift lever constituting the input side of the speed change shift device 6. Reference numerals 8,8,8 and 9 show shift forks and a reverse shift bar, respectively, constituting the output side of the speed change shift device. The speed change shift device 6 permits, by operation of the shift pedal 7, selective operation of the forward transmission 3 with respect to the shift fork 8,8,8, or the shift bar 9 with respect to the reverse reduction gear 5, whereby shifting can be performed between plural forward steps and a reverse step.

The forward transmission 3 comprises a three-shaft type of transmission in which an input shaft 10, an intermediate shaft 11 and an output shaft 12 are rotatably mounted on the housing 2 and are disposed parallel to each other. Forward speed change gear trains 13 are interposed between the input shaft 10 and the intermediate shaft 11. Engagement is made between a forward output gear 14 fixed on the intermediate shaft 11 and a forward input gear 15 fixed on the output shaft 12 so as to operatively connect the intermediate shaft 11 and the output shaft 12. The power transmitted from the engine 1 to the input shaft 10 via a clutch 16 is transmitted to the output shaft 12 via one of the forward speed change gear trains 13 by selecting the desired one of the plural steps of the transmission system according to the travelling condition of the motorcycle. The power is transmitted to a drive shaft 18 from the output shaft 12 through the intermediary of bevel gear trains 17 provided on an end of the output shaft 12, thereby driving the rear wheel.

The reverse reduction gear 5 is interposed between the output shaft 12 and the electric motor 4, and comprises a reduction gear 19 of the planetary gear type driven by the electric motor 4, and idling shaft 20, and connecting gear trains 21 interposed between the idling shaft 20 and the output shaft 12. The power of the electric motor is transmitted to the output shaft 12 as the power for reverse rotation by means of the reverse reduction gear 5, and the rear wheel is driven in the reverse direction by the power from the electric motor 4 transmitted through the output shaft 12 of the forward transmitting system.

The reduction gearing 19 of the planetary gear comprises a reduction gear 22 of a first planetary gear accommodated in the motor casing portion 2a and the reduction gear casing portion 2b, respectively, of the housing 2 and the reduction gear 23 of a second planetary gear. The electric motor 4 is connected directly with the reduction gear 22 of the first planetary gear, and the reduction gear 23 of the second planetary gear is connected in series with the reduction gear 22 of the first planetary gear. The power is transmitted from a cylindrical shaft 23a which is an output shaft of the reduction gear 23 of the second planetary gear to the connecting gear trains 21. Thus, the rotational speed of the electric motor 4 is reduced over two steps, whereby it is possible to obtain a sufficient value of torque and the reverse motion of the vehicle at a slight speed.

The connecting gear trains 21 comprise a reverse output gear 21a rotatably supported on the idling shaft 20, and idling gear 21b which is spline-engaged in a spline portion of the reverse output gear 21a and which rotates integrally with the latter, and a reverse input gear 21c fixed to the end of the output shaft 12. The idling gear 21b is meshed with a tooth shape formed on the cylindrical shaft 23a of the reduction gear 23 of the second planetary gear, and the reverse input gear 21c is arranged to mesh with the reverse output gear 21a. Accordingly, the output shaft 12 is operatively connected to the reduction gearing 19 of the planetary gear, whereby the output shaft 12 is enabled to reversely rotate.

The idling shaft 20 is slidably supported on the housing 2 and is adapted to advance and retract integrally with the reverse output gear 21a, the axial movement of which is limited to the movement of the idling shaft 20. The idling shaft 20 can be displaced between a connecting position in which the reverse output gear 21a is advanced to mesh with the reverse input gear 21c, whereby the power of the electric motor 4 is transmitted to the output shaft 12, and a disconnected position in which the reverse output gear 21a is retracted to release the engagement with the reverse input gear 21c, whereby the power of the electric motor 4 to the rear wheel is interrupted. This displacement is enabled by the engagement of one end of the reverse shift bar 9 to an engaging portion 20a provided on the idling shaft 20 and effected by the swing of the reverse shift bar 9, whereby the connection required to permit the reverse movement is effected.

Further, in the present embodiment, the reverse reduction gear is arranged to connect with the output shaft 12. However, in a so-called "two shaft" type of transmission in which the output is taken out of the intermediate shaft 11 in the present embodiment, it goes without saying that it is possible that the reverse drive can be realized by connecting the reverse reduction gear 5 to the intermediate shaft 11.

The speed change shift device 6 has a shift fork shaft 24 which supports the shift forks 8,8,8 and engages the reverse shift bar 9, and a shift drum 25 which is provided parallel to the shift fork shaft 24. The shaft 24 is slidably supported on the housing 2, and engages each shift fork 8 for mutual sliding movement. The shaft 24 also slides in a direction to cause the reverse shift bar 9 so as to swing it. The shift drum 25 comprises a cylindrical cam rotatably supported on the housing 2. The shift forks 8,8,8 are slidably moved by the cam action of the cylindrical cam, and the reverse shift bar 9 is swung through the intermediary of the shift fork shaft 24.

Fork portion 8a of each shift fork 8 operatively relates to the forward speed change gear trains 13 and each contain a pin portion 8b that is adapted to engage with a cam groove 25a of the shift drum 25. Each shift fork is selectively slidably moved by the rotation of the shift drum 25, whereby it is possible to effect a forward shift in plural steps which makes it possible to connect the required transmitting system to the forward speed change gear trains 13 and a neutral shift which interrupts power to the rear wheel.

The intermediate portion 9a of the reverse shift bar 9 is swingably supported on a protruding portion 2c of the housing 2. The output end 9b of the reverse shift bar 9 connects with the engaging portion 20a of the idling shaft 20, and the input end is engaged to a projection 24a on the end of the shift fork shaft 24. To the shift fork shaft 24 is fixed a follower 26 whose pin portion 26a is engaged in the cam groove 25a so as to be operatively connected with the shift drum 25. The reverse shift bar 9 is swung by the rotation of the shift drum 25, and displaces the connecting gear trains 21 by a lever action having as a center the intermediate portion 9a. Thus, each shift is selected and, if the forward shift or the neutral shift is selected, the reverse shift is not performed. Conversely, if the reverse shift is selected, the phase of the cam groove 25a is adjusted so that the neutral shift is performed, whereby the forward transmitting system and the reverse transmitting system will not be connected simultaneously.

Between the shift drum 25 and the gear shift shaft 27 provided parallel to the shift drum 25 is interposed a selectively rotatable mechanism 28 which is actuated by the operation of the shift pedal 7 through the intermediary of an operatively connecting mechanism 29 and which limits the rotation of the shift drum 25 to six steps corresponding to four steps of forward movement, the neutral step, and the reverse step.

The operatively connecting mechanism 29 comprises a gear shift shaft 27 rotatably supported on the housing 2, a pedal shaft 30, and a shift gear train 31 provided between said shafts 27 and 30. The shift pedal 7 is fixed to the end of the pedal shaft 30, and the gear shift shaft 27 rotates by the swing of the shift pedal 7 thereby operating the selectively rotatable mechanism 28.

Figure 4:
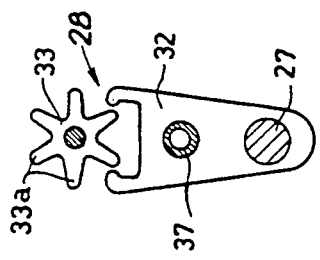
FIG. 4 is a sectional view taken along line IV—IV of FIG. 3.
Figure 5:
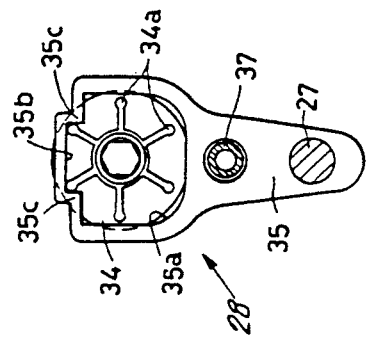
FIG. 5 is a sectional view taken along line V—V of FIG. 3.

The selectively rotatable mechanism 28, as shown in FIGS. 4 and 5, comprises an operating claw 32 fixed to the gear shift shaft 27, a ratchet 33 fixed to the shift drum 25, a click cam 34 mounted on the ratchet 33 clamped together with the latter on the shift drum 25, and a limiting stopper 35 provided to cover the click cam 34.

The claw 32 is swung by the gear shift shaft 27 and is energized to always return to the neutral position through the intermediary of a cylindrical body 37 fixed to a middle portion of the claw 32 by a return spring 36 against the swing of the gear shift shaft 27. The operating claw 32 effects movement of the ratchet 33 one tooth at a time by the opposed claw fingers provided on its leading end.

The ratchet 33 has six claw teeth 33a - 33a corresponding to the respective speed change steps of the shift pedal 7 and rotates at six steps. On the click cam 34, that rotates integrally with the ratchet 33, are provided six cam projections 34a - 34a corresponding to the respective claw teeth 33a - 33a, the cam projections 34a - 34a being adapted to abut to the limiting stopper 35.

The stopper 35 is energized on the side of the click cam 34 by using an abutting point on the operating claw 32 as a fulcrum by means of a coil spring 38 and has a window opening 35a facing to the cam projections 34a - 34a. The opening 35a contains a recess 35b defined by step portions 35c, 35c at each side of the recess 35b into which recess a pair of adjacent cam projections 34a, 34a are adapted to fit. Thus, click stop action is effected by the recess 35b and the step portions 35c, 35c against the rotation of the click cam 34.

Figure 6:
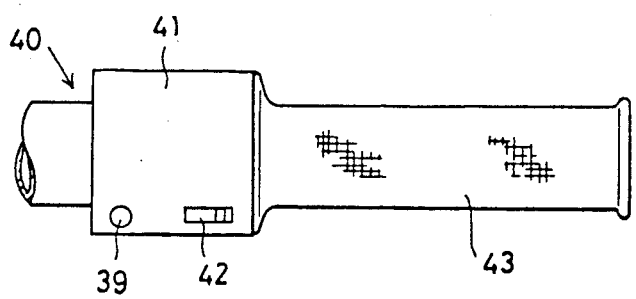
FIGS. 6 and 7 are enlarged views of the vehicle handle grip illustrating the disposition of the electric motor switches.
Figure 7:
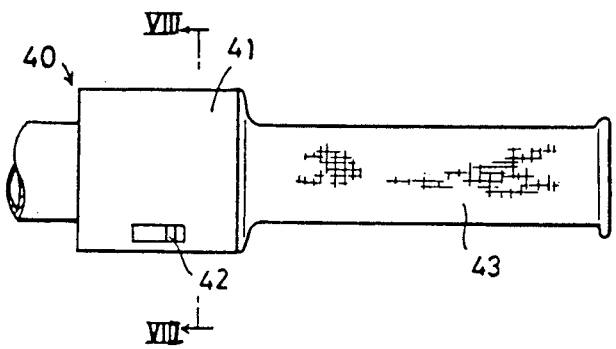
Figure 8:
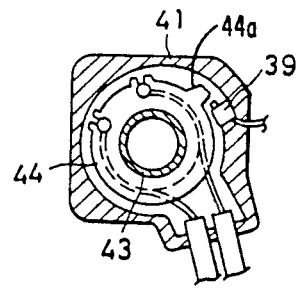
FIG. 8 is a sectional view taken along line VIII—VIII of FIG. 7.

The electric motor 4 is a dedicated low speed motor employed as a reverse power source, and, as shown in FIG. 6, a driving switch 39 of the electric motor 4 is juxtaposed to the starter switch 42 of the starter motor in a switch box 41 provided on the handle 40, whereby it is possible to operate the switch when the throttle grip 43 is in a condition of being gripped. However, as shown in FIG. 8, a projection 44a is provided on the throttle spool 44 of the throttle grip 43 accommodated inside the switch box 41. The driving switch 39 is mounted on an inner surface of the switch box 41. By the rotation of the throttle spool 44, that is, when the throttle grip 43 is rotated from the idling position further in a direction of reduction, the projection 44a abuts the driving switch 39, whereby the driving switch 39 is closed.

Figure 9:
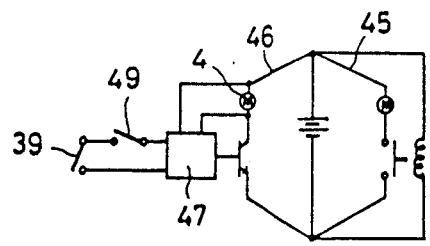
FIGS. 9 and 10 are circuit diagrams illustrating electric motor control circuits.

A control circuit of the electric motor 4, as shown in FIG. 9, comprises an electric motor circuit 46 provided in parallel with the starter motor circuit 45 and an adjusting circuit 47 provided in the electric motor circuit 46. By this arrangement, the terminal voltage of the electric motor 4 is detected in the adjusting circuit 47 and the amount of voltage passing to the electric motor 4 is controlled according to the load, whereby the vehicle speed is adapted to be kept constant. Also, as shown in FIG. 10, it is possible to use a magnetic switch 48, like that in the starter motor circuit 45, in the circuit 46 for the electric motor 4.

Figure 10:
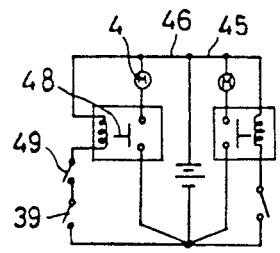

Further, in FIGS. 9 and 10, reference numeral 49 indicates a neutral switch which is arranged to abut the shift drum 25 and to close when the shift drum is in the neutral shift condition and the reverse shift condition. The neutral switch 49 is caused to be opened when the shift drum is disposed in its forward driving condition so that the electric motor 4 cannot be employed. In this way an error of operation can be prevented.

By the organization described above, when the vehicle is shifted from a forward drive condition to the reverse condition, if the shift pedal 7 is shifted from the neutral position to the reverse position and the driving switch 39 of the electric motor 4 is pushed, the vehicle reverses at a slight speed. In such a manner, the operation for reverse movement can be performed promptly and simply.

Moreover, when the shift pedal 7 is in its forward driving position or the neutral position, the connecting gear train 21 is always in the disconnected position and the displacement to the reverse shift cannot be performed, and, even if the electric motor 4 rotates by mistake, transmission of power to the output shaft 12 is not carried out. When the shift pedal 7 is in the reverse position, on the other hand, the forward speed change gear trains 13 are always in the neutral shift condition, whereby the power of the engine 1 is interrupted and transmission of power to the output shaft 12 is not performed.

Consequently, according to the present invention, when the vehicle is required to be moved in a reverse direction in a parking area or in the middle of a sloping road or the like, the reverse operation is performed promptly and easily, even if the vehicle is of heavy weight, by effecting the forward and the reverse movements by the same shift system. Also, it is possible by means of the described organization to prevent the engine and the electric motor from acting simultaneously on the output shaft. Further, the organization, in producing its effect, is capable of utilizing the power transmitting system and the speed change shift system already in place in an established vehicle.

Figure 11:
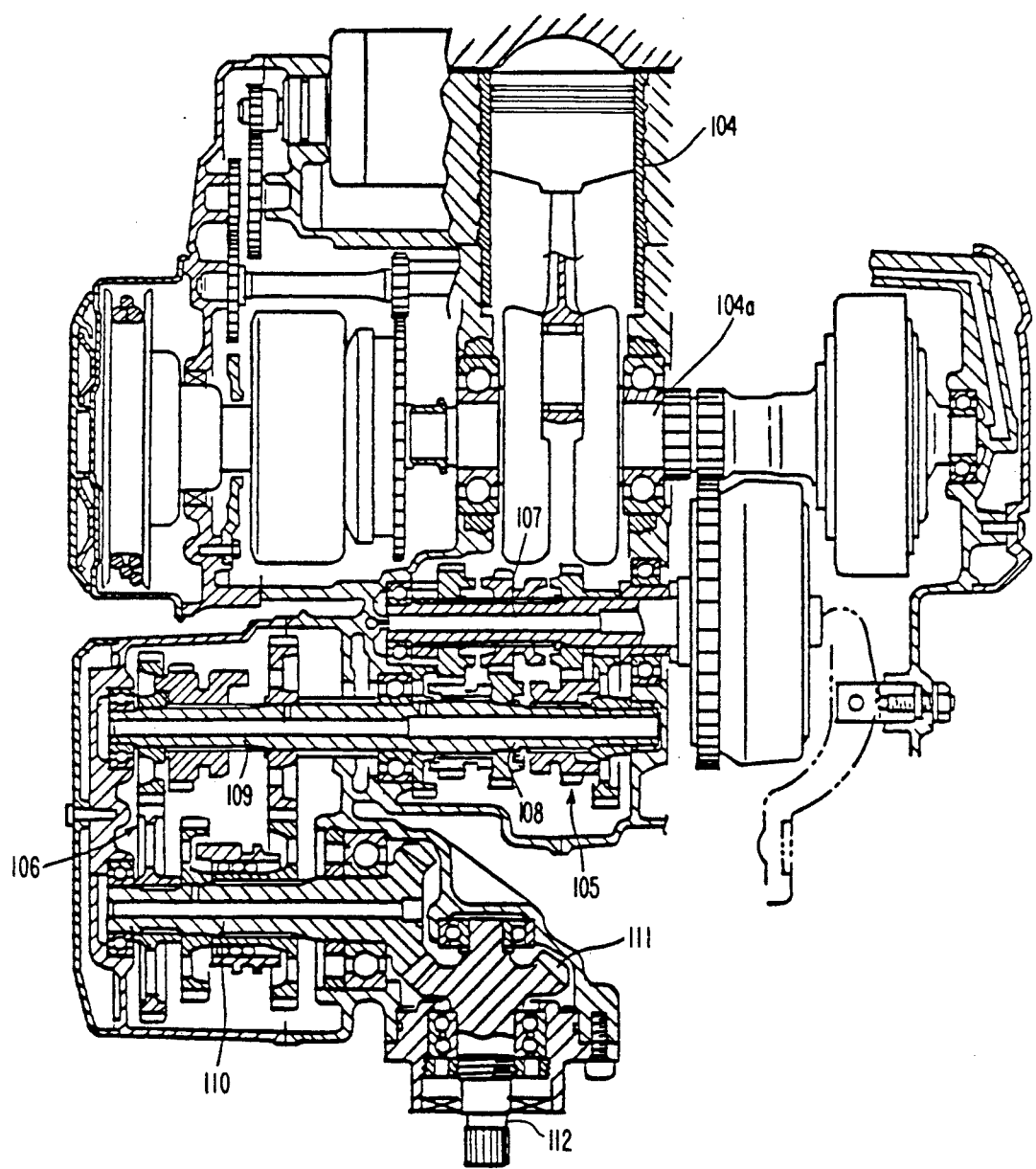
FIG. 11 is a sectional view similar to FIG. 2 illustrating another motorcycle power unit usable with the vehicle of FIG. 1.

Next, description is made about the power transmission system with reference to FIG. 11. The main transmission 105 has a front input shaft 107 and a rear output shaft 108. With the input shaft 107 is operatively associated a crank shaft 104a of the engine 104. Further, the sub-transmission 106 has an output shaft 108, an input shaft 109 arranged laterally to the latter, and an output shaft 110 arranged rearward to the input shaft 109. The output shaft 110 is operatively associated with the aforesaid rear wheel $W_R$ through the intermediary of a bevel gear 111 and a propeller shaft 112.

The sub-transmission 106 is adapted to be capable of switching between two step forward positions of high speed and low speed and one step rearward position by the actuation of a manipulating lever (not shown).

The gear ratio employed is designed so that the ratio of the revolution number Ne of the engine to the revolution number Nw of the rear wheel $W_R$, that is, a reduction ratio G=Ne/Nw approaches to 120 in case that the sub-transmission 106 is set in the rearward position.

When the revolution number Ne of the engine is at low speed revolutions of about 2000 rpm, the revolution number Nw of the rear wheel $W_R$ is about 16.7 rpm under the aforementioned gear ratio. Assuming that the radius of the outer peripheral circle of the rear wheel is 0.331 m, the reverse speed Vr becomes:

$$Vr = 2\pi r \times Nw \times 60/1000$$
$$= 2\pi \times 0.331 \times 16.7 \times 60/1000$$
$$= 2.08 \text{ (km/h)}$$

and therefore, the reverse speed becomes about 2 km/h.

Figure 12:
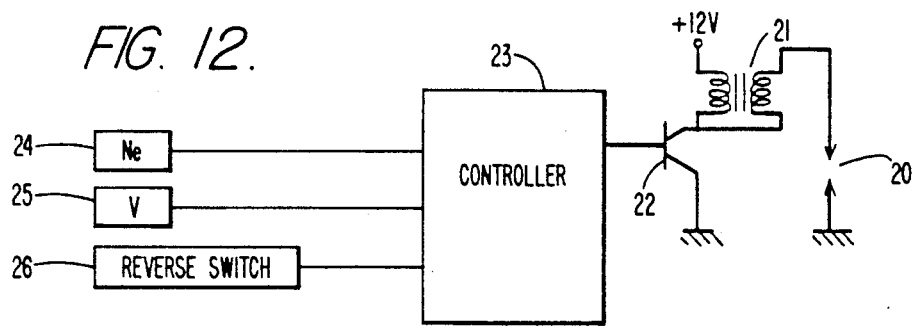
FIG. 12 is a block diagram showing the operation of a vehicle speed control mechanism of the power unit of FIG. 11.
Figure 13:
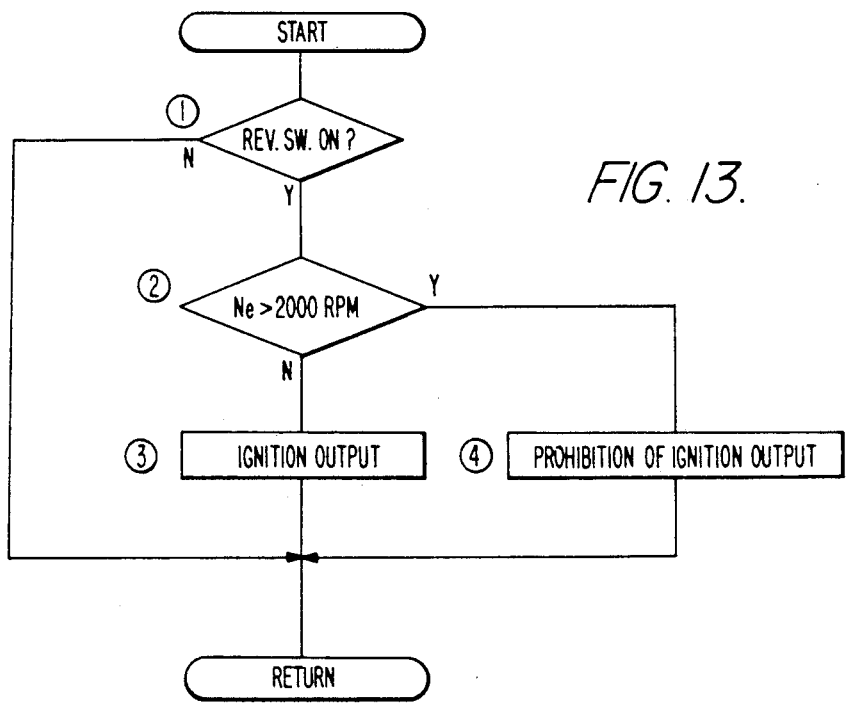
FIG. 13 is a flow chart illustrating control procedures utilized in a speed control mechanism.

As a manner dealing with a case in which the revolution number of the engine becomes above 2000 rpm on reversing, an embodiment of the control mechanism is shown in FIGS. 12 and 13 and is described with reference to the latter.

FIG. 12 is a block diagram showing a vehicle speed controlling mechanism, and the circuit is so constituted that a controller 123 is adapted to control an ignition device in which a transistor 122 is connected with an ignition coil 121 permitting an ignition plug 120 to ignite.

An output of the controller 123 is connected with a base terminal of the power transistor 122, and the ignition plug is allowed to ignite due to a high voltage occurring in the ignition coil 121 by turning on the power transistor 122. The controller 123 is capable of regulating the revolutions of the engine by controlling the existence of the ignition or changing its timing.

To the controller 123 are input signals from a detecting sensor 124 for detecting the revolution number of the engine; from a vehicle speed detecting sensor 125 for detecting the vehicle speed; and from a reverse switch 126 for detecting the fact that the transmission is in the reverse position.

Next, control procedures in the controller 123 are described according to the flow chart of FIG. 13.

Firstly, a determination is made about whether or not the reverse switch 126 is on (step ①), and if it is not on, the present control is not performed.

If the reverse switch 126 is on, the flow proceeds to a step ② and a determination is made about whether or not the revolution number Ne of the engine is above 2000 rpm. If it is under 2000 rpm, the ignition is performed at a previous state (step ③). If it is above 2000 rpm, the ignition output is prohibited (step ④), whereby the revolution number of the engine is reduced without generating power.

As long as the revolution number Ne of the engine is above 2000 rpm, the steps ①, ② and ④ are repeated to reduce the revolution number of the engine. When it becomes less than 2000 rpm, the step moves to the step ③, whereby the ignition is started.

Accordingly, the revolution number of the engine is suppressed to less than 2000 rpm and is adapted to be suppressed at the reverse speed less than about 2 km/h under the reduction of 120. Also, in the step ②, the existence of the ignition control is determined on the basis of the revolution number of the engine, but it may be determined directly on the basis of the vehicle speed. That is, if the vehicle speed is less than 2 km/h, the step proceeds to the step ③, whereby the control is not performed, and if the vehicle speed is above 2 km/h, the step proceeds to the step ④ thereby prohibiting the ignition output.

Further, the ignition timing is delayed in the prohibition of the ignition output of the step ④, whereby the revolution number of the engine may be reduced.

Figure 14:
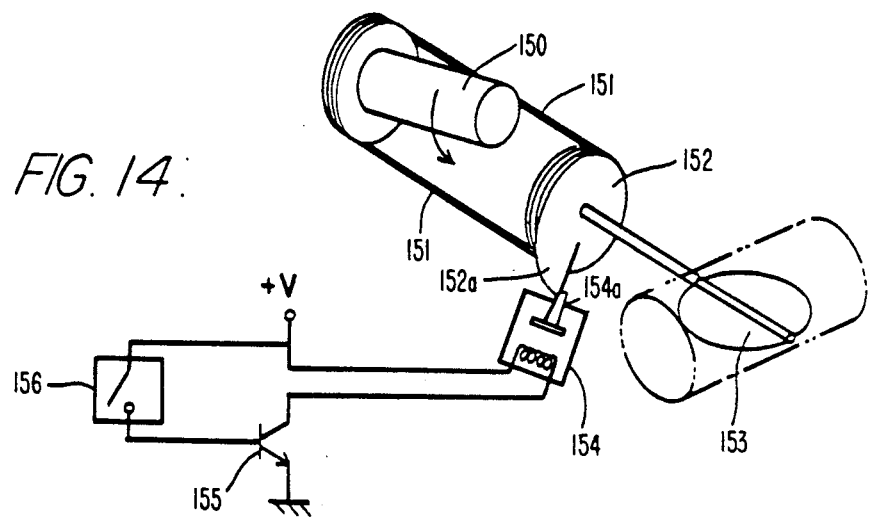
FIG. 14 is a schematic representation of throttle lock mechanism utilized for another speed control.

Next, the embodiment which is shown in FIG. 14 is described, which embodiment is provided with a throttle lock mechanism as a vehicle speed controlling device. A manipulating wire is spanned between a throttle grip 150 provided on a grip of a right side handle and a pulley 152 operating a throttle valve 153. When the throttle grip 150 is rotated toward this side, the pulley 152 rotates through the intermediary of the manipulating wire 151, whereby the throttle valve 153 of the carburetor operatively connected with the pulley is opened to increase the amount of fuel supply, and the vehicle speed can be increased.

In such a mechanism, when a protruding portion 152a is formed at a required position on the pulley 152 and an actuating pin 154a of a solenoid 154 fixed near the pulley 152 projects toward the protruding portion 152a, if the rotation of the pulley 152 assumes a certain position of rotation, the protruding portion 152a of the pulley 152 abuts the actuating pin 154a so as to limit the rotation of the pulley 152.

The coil of the solenoid 154 is connected at one end with a power supply and is connected at the other end with the collector terminal of a power transistor 155 of the emitter earthed type, the base terminal of the power transistor 155 being connected with one contact of the reverse switch 156. The other contact of the reverse switch 156 is connected with the power supply, and, when the reverse switch 156 is activated, the power transistor 155 is energized, whereby current flows in the coil of the solenoid 154 and the actuating pin 154a is extended so as to be adapted to protrude. Accordingly, when the reverse switch 156 is activated and is in the reverse state, even if the rotation of the throttle grip 150 is effected in a direction to increase the vehicle speed, since rotation cannot exceed a certain value, being limited by the pin 154a.

By setting the limiting angle of rotation to the revolution number of the engine of 2000 rpm, the reverse speed of the vehicle can be suppressed up to the maximum of 2 km/h under the reduction ratio of 120.

The following description will be made about another embodiment which performs the reverse motion by using a starter motor as a power source, with reference to FIGS. 15 to 18.

In order to have a low vehicle speed and a small change of vehicle speed to load, a vehicle speed controlling device is generally required. Such circumstance is described on the basis of the motor characteristics of FIG. 15.

Figure 15:
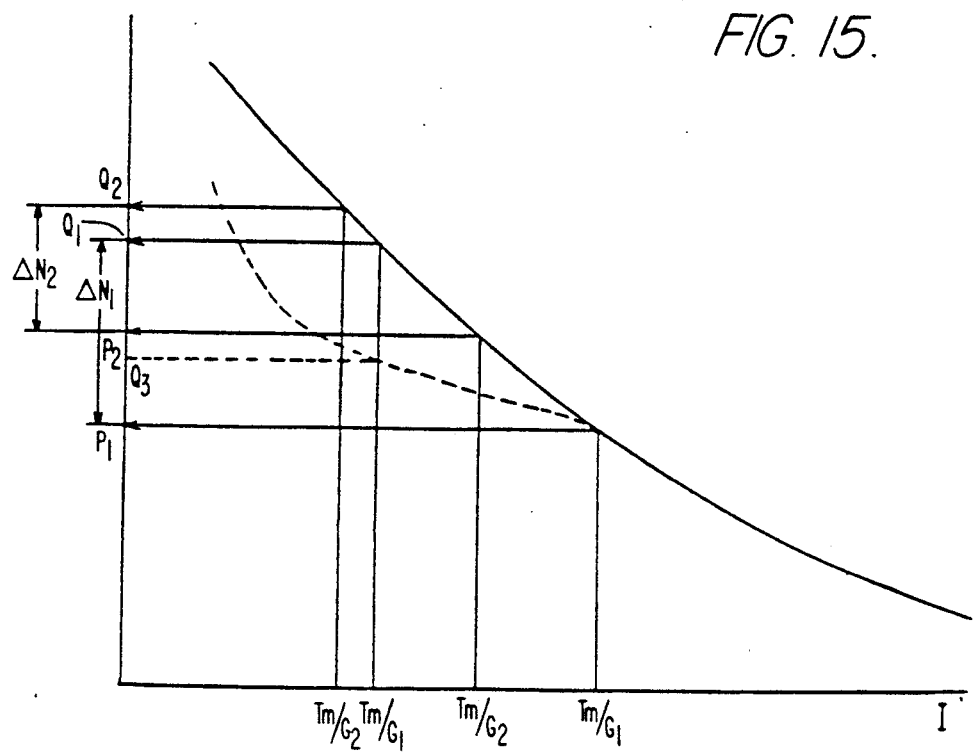
FIG. 15 is graph illustrating the characteristic operating curves of a starter motor.

Since a direct current series wound motor is used as a starter motor, the revolution number N is inversely proportional to the load current I and the curve slope falls toward the right side as shown in FIG. 15. Consequently, when the reduction ratio is shown at $G_1$, the maximum load at $T_M$ and the minimum load at Tm, from the relationship that, if the reduction ratio becomes larger, the load is reduced inversely to the reduction ratio and the relationship of the load current to the maximum load of $T_M$ becomes $Tm/G_1$ and the relationship of the load current to the minimum Tm becomes $Tm/G_1$, the revolution number to the load current being shown by $P_1Q_1$. Accordingly, when the reduction ratio is $G_1$, the changing value of the revolution umber becomes $P_1Q_1=\Delta N_1$, and this corresponds to the changing value of the vehicle speed.

In order to diminish the changing values, the characteristics may be modified as shown by a dotted line by using a vehicle speed controlling device, such as a resistance control, a chopping control, or the like.

As is evident, since the revolution number to $Tm/G_1$ falls from $Q_1$ to $Q_3$, the changing values of the revolution number can be suppressed only a little. However, the provision of such a vehicle speed control device is high in cost and in weight, and further, has the inconvenience that the discharging efficiency of the battery decreases from the loss of current control.

Accordingly, the present embodiment is so constituted that by setting the reduction ratio at a large appropriate value, the changing values of vehicle speed diminishes and enters within the range of values that can be practically allowed. That is, in the maximum load $T_M$ and the minimum load Tm, as shown in FIG. 15, when the reduction ratio is increased from $G_1$ to $G_2$ ($>G_1$), the changing values of the load current becomes smaller. When taking the ratio of the changing values of the load current, it becomes as follows:

$$\frac{T_M/G_1 - Tm/G_2}{T_M/G_1 - Tm/G_1} = \frac{G_1}{G_2} < 1$$

Obviously, the changing values of the load current becomes smaller.

Accordingly, the changing values of $P_2 Q_2 = \Delta N_2$ of the revolution number to the changing values of the load current which became smaller, becomes smaller than the changing values of $\Delta N_1$ when the reduction ratio is $G_1$, that is, the changing values of the vehicle speed becomes smaller.

In the present embodiment, the ideal reduction ratio is being sought. That is, the range of changing load required is calculated on the basis of vehicle weight, inclination and rolling resistance. In the large sized motorcycle, the vehicle weight amounts to 350 kg–800 kg (including load and traction), and the inclination amounts to be encountered will be from 0° to about 6°. Since this range of inclination includes almost all of what can be expected in actual use of the vehicle when the calculation is made according to this value, the maximum load $T_M$ amounts to about 45 kg.m and the minimum load Tm amounts to about 4.0 kg.m.

Figure 16:
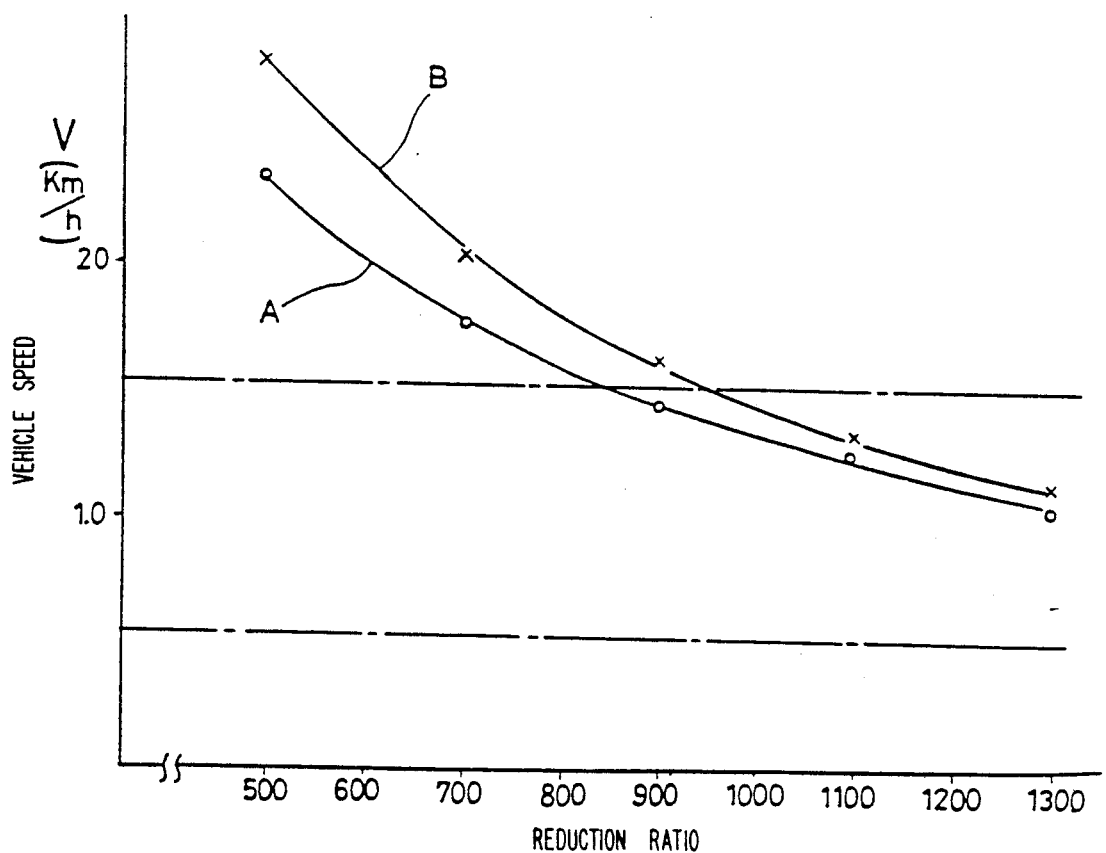
FIG. 16 is a graph illustrating the relationship between vehicle speed and reduction ratio.

FIG. 16 is a diagram showing the relationship of vehicle speed to reduction ratio, and the curve "A" shows the change of vehicle speed to the reduction ratio for maximum load $T_M$. FIG. 16 is a graph which is shown by seeking a motion of the revolution number when the reduction ratio is changed in the maximum load $T_M$ on the basis of the characteristic curve of FIG. 15 and by converting the sought motion into a vehicle speed.

Further, for the minimum load Tm, the curve "B" shows the change of the vehicle speed to the reduction ratio. Assuming that 0.5 km/h–1.5 km/h is a range of change of the vehicle speed allowed, when the reduction ratio is sought from FIG. 16, it can be seen that the reduction ratio may be more than about 1000.

Figure 17:
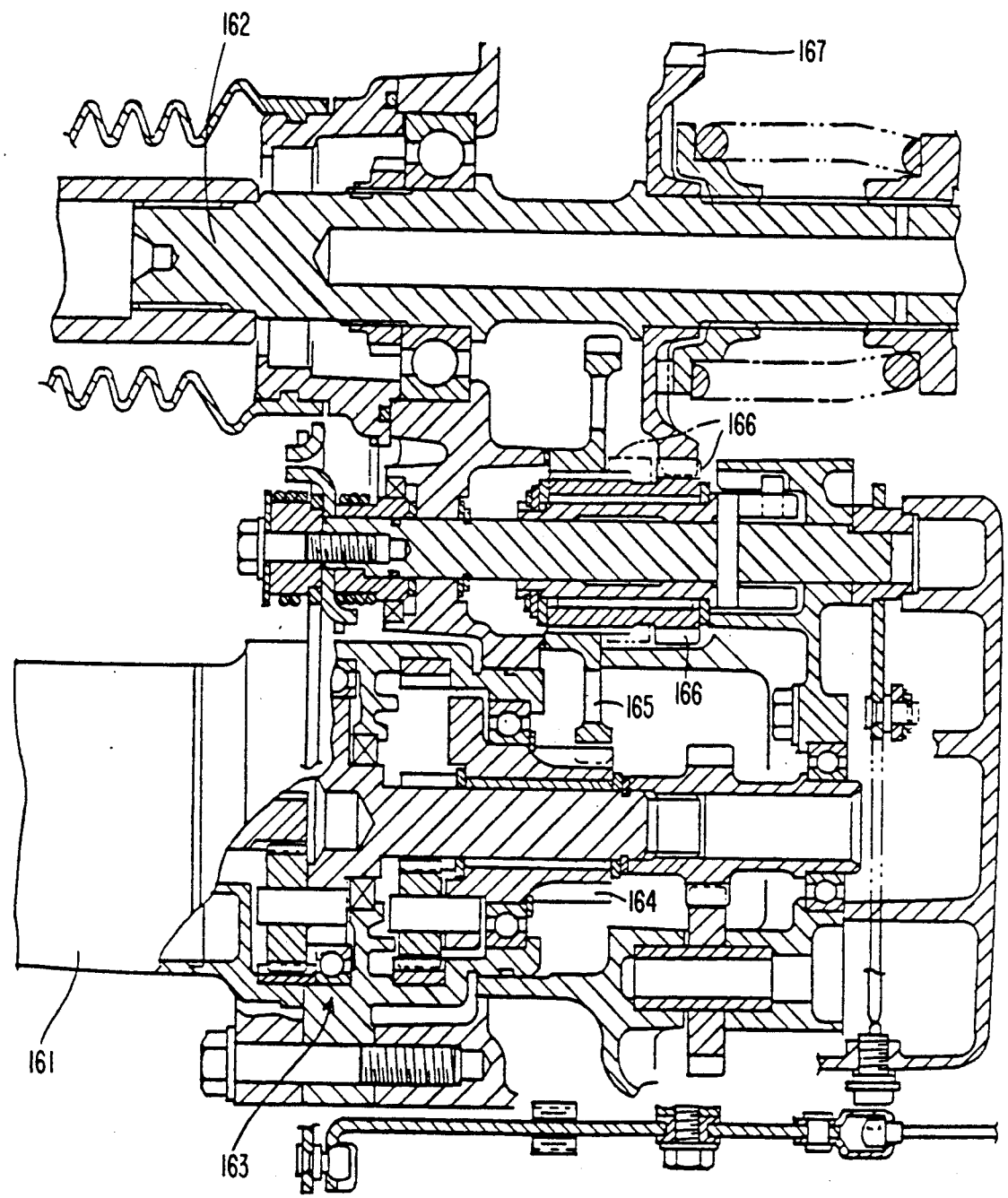
FIG. 17 is a sectional view of a reverse drive transmitting mechanism using a starter motor as a power source.

Then, FIG. 17 shows a transmission mechanism which transmits reversing power under a reduction ratio of more than 1000 from the starter motor through the intermediary of a transmission. In this drawing figure, reference numeral 161 indicates the starter motor and reference numeral 162 indicates an output shaft, the latter being connected to the rear wheel. The output of the starter motor 161 is transmitted to a two stop planetary gear 163 so as to be reduced at each step, whereby the output of the rear step thus reduced at the two steps is transmitted to the following mechanism. Further reductions are obtained by combinations of a reverse driving gear 164 and an associated gear 165, and of a slide gear 166 and a reverse driven gear 167, whereby the output shaft 162 and, therefore, the wheel is moved in reverse at a slight speed.

In the described organization the gear ratio is set so that the reduction ratio of the revolution number of the rear wheel to the revolution number of the starter motor 161 becomes more than 1000.

Figure 18:
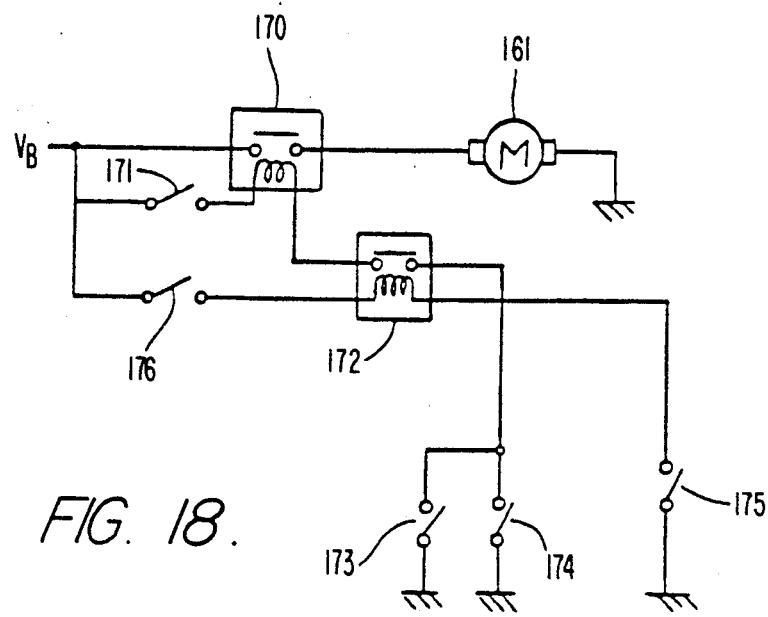
FIG. 18 is a circuit diagram showing a control system of said starter motor.

A control system for the starter motor 161 in the same embodiment is arranged as shown in FIG. 18. To a power supply $V_B$ is connected the starter motor 161 through a contact of a normally open type of starter relay 170. One end of the coil starter relay 170 is connected with the power supply $V_B$ through a starter switch 171 and the other end is connected with a neutral switch 173 and a clutch switch 174 through the intermediary of a contact of a normally closed type of reverse relay 172. The neutral switch 173 and the clutch switch 174 are connected in parallel with each other. One end of a coil of the reverse relay 172 is connected with the power supply $V_B$ through a reverse lever switch 176 and the other end is connected with an oil pressure switch 175. The oil pressure switch 175 is deactuated on driving the engine and is actuated upon stopping the engine. Accordingly, if the reverse gear is not put in its operative position on stopping the engine, since the reverse lever switch 176 is deactivated and the reverse relay 172 is in a non-conductive state having closed contacts, when the starter switch 171 is pushed, the starter relay 170 comes into its conductive state, whereby the contacts are closed so as to be capable of starting the motor 161.

If the reverse gear is put in the operative position on driving the engine, the reverse lever switch 176 and the oil pressure switch 175 are in their ON state and therefore the contacts of the reverse relay 172 are open, whereby the starter motor cannot be started.

If the reverse gear is not put in the operative position on driving the engine, the reverse lever switch 176 is in its OFF state and the reverse relay 172 is in its non-conductive state having the closed contacts. Accordingly, if the starter switch 171 is pushed, the starter motor 161 runs idle.

If the reverse gear is put in the operative position on driving the engine, the reverse lever switch 176 is in its ON state, but the oil pressure switch 175 in its non-conductive state, that is, the contacts are closed. Accordingly, the starter switch 171 is in the ON state and short-circuits the contacts, whereby the starter motor 161 is driven to be capable of performing the reverse motion.

In this condition, the drive of the starter motor 161 is reduced through the intermediary of the transmitting mechanism and is transmitted to the rear wheel. Thus, if the reduction ratio is set above 1000, a large sized motorcycle can be driven reversely at a low speed falling within the allowed range of vehicle speed without providing a vehicle speed controlling device. Due to the fact that the vehicle speed controlling device is not required, it is possible to decrease the weight and the cost and further to raise the discharging efficiency of the battery. Further, the described embodiment of the device has been organized to produce the reverse motion by using a starter motor as a power source. However, a direct current series wound motor is generally used even in a case that a reverse motor is used separately. Therefore, if its performance is substantially identical to that of the starter motor, it is possible to realize the reverse motion at a low speed within the allowed range of vehicle speed by setting the reduction ratio to above 1000.

Figure 19:
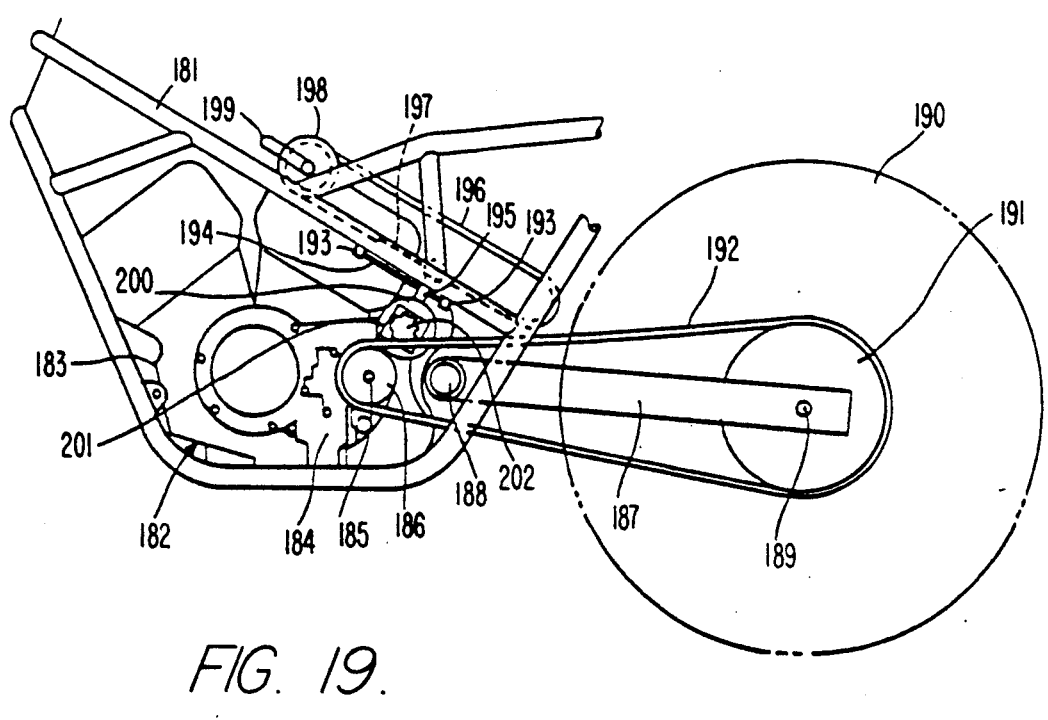
FIG. 19 is a partial side view of a motorcycle using an exclusive, dedicated motor similar to that in FIG. 2 for reverse drive.

FIG. 19 shows an embodiment using such a dedicated reversing motor, and the following description is made with respect to this figure. On the vehicle body frame 181 is carried a power unit 182 which comprises an engine 183 and a gear transmission 184 including a clutch. A drive sprocket 186 is fitted integrally with the output shaft 185 of the gear transmission. A base end of a rear fork 187 is pivotally mounted on the vehicle body frame 181 through the intermediary of a fork pin 188 to be capable of swinging vertically. The base end of the fork 187 is arranged rearwardly of the drive sprocket 186 and adjacent thereto. A rear wheel 190 is rotatably mounted by the rear end of the rear fork 187 through the intermediary of an axle shaft 189. A chain 192 is spanned between a driven sprocket 191 integral with the rear wheel 190 and the drive sprocket 186. A pair of front and rear brackets 193 extend from the vehicle body frame 181 above the output shaft 185 and the fork pin 188. To the brackets 193 are integrally fixed the opposite ends of a guide bar 194 onto which a slider 195 is slidably fitted. Also, parallel to the guide bar 194 is disposed a guide tube within which an endless wire 197 slides and on which the slider 195 is connected. A reverse lever 199 is mounted integrally with a reverse pulley 198. To the slider 195 is integrally attached a reverse motor 200, a rotary shaft of which is connected with a reverse sprocket 202 through the intermediary of a combination 101 of gears, such as planetary gears, or the like.

Thus, by engaging the chain 192 with the gear combination 201 and the reverse sprocket 202, the revolution number of the reverse motor 200 is reduced to 1/100 and is transmitted to the rear wheel 190. Accordingly, when the clutch in the engine 104 is put in an interrupted state and the reverse lever 199 is brought down from the upper part to the front part, the endless wire 197 is moved forwardly in a counterclockwise direction and the reverse sprocket 202 is meshed with the chain 192, thereby obtaining a reversible state. In this state, when the reverse motor 200 is rotated and driven, the chain 192 is moved in a clockwise direction and the motorcycle produces its reverse motion.

The reverse motor 200 used in this embodiment is capable of suppressing to a small value the change of reverse vehicle speed to the change of load and performing a reverse motion at a low speed, by carrying out an appropriate reduction of less than 1/100 from its original output characteristics.

It should be further understood that, although preferred embodiments of the invention have been illustrated and described herein, changes and modifications can be made in the described arrangements without departing from the scope of the appended claims.

We claim:

1. A vehicle comprising:
   a driving wheel;
   an output shaft drivingly connected to said driving wheel;
   an internal combustion engine operatively connectable to said output shaft through gear train means defining a variable forward motion transmission;
   a reverse drive motor operatively connectable to said output shaft through a gear train defining a reverse motion transmission;
   a speed change shift device for selectively connecting either said forward motion transmission or said reverse motion transmission to said output shaft, said speed change shift device including a movable operator containing a plurality of mutually spaced cam means including first cam means operable when said speed change shift device is in a first position to operably connect said forward motion transmission to said output shaft to the exclusion of said reverse motion transmission, and second cam means operable when said operator is in a second position spaced from said first position to operably connect said reverse motion transmission to said output shaft to the exclusion of said forward motion transmission; and means for moving said speed change shift device operator between said positions.

2. The vehicle according to claim 1 in which said reverse drive motor is an electric motor.

3. The vehicle according to claim 2 in which said electric motor is dedicated exclusively to reverse driving of said output shaft.

4. A vehicle according to claim 1 in which said reverse motion transmission includes an idler shaft containing gear means for connection with said output shaft, said idler shaft being movable between longitudinally spaced positions by movement of said speed change shift device operator to connect said reverse motion transmission gear means to said output shaft when said operator is in a position for disconnecting said forward motion transmission gear means from said output shaft and to disconnect said reverse motion transmission gear means from said output shaft when said operator is in a position for connecting said forward motion transmission gear means thereto.

5. A vehicle according to claim 4 in which said speed change shift device includes:

an axially movable shift fork shaft;

cam-operated shift fork means slidably mounted on said shift fork shaft;

said first cam means on said operator being operative to move said shift fork means along said shift fork shaft to connect said forward motion transmission gear means to said output shaft and said second cam means on said operator being operative to move said shift fork shaft axially; and a pivotably mounted lever connecting said shift fork shaft to said idler shaft for moving said idler shaft in response to movement of said shift fork shaft between positions on which said reverse motion transmission is either connected to or disconnected from said output shaft.

6. A vehicle according to claim 5 in which said speed change shift device operator comprises a rotatably mounted cylindrical drum having circumferential cams thereon containing a profile for axially shifting said shift forks along said shift fork shaft in response to rotational movement of said drum, and manually operated means for rotating said drum.

7. A vehicle according to claim 6 in which said speed change shift device includes a plurality of individually shiftable cam-operated shift forks on said shift fork shaft for selectively varying the speed generated by said forward transmission means and in which said drum rotating means includes indexing means for rotating said drum in indexed steps between the respective of the positions of said drum.

8. A vehicle according to claim 7 including a foot-operated pedal for rotating said drum.

* * * * *